United States Patent
Sahin et al.

(10) Patent No.: US 10,031,953 B1
(45) Date of Patent: Jul. 24, 2018

(54) GENERATING QUERY ANSWERS

(71) Applicant: Google LLC, Mountain View, CA (US)

(72) Inventors: Engin Cinar Sahin, New York, NY (US); Vinicius J. Fortuna, New York, NY (US); Emma S. Persky, New York, NY (US)

(73) Assignee: Google LLC, Mountain View, CA (US)

( * ) Notice: Subject to any disclaimer, the term of this patent is extended or adjusted under 35 U.S.C. 154(b) by 904 days.

(21) Appl. No.: 13/803,986

(22) Filed: Mar. 14, 2013

(51) Int. Cl.
*G06F 17/30* (2006.01)

(52) U.S. Cl.
CPC .............................. *G06F 17/30551* (2013.01)

(58) Field of Classification Search
USPC ................... 707/770, 737, 779, 9, 10; 705/2
See application file for complete search history.

(56) References Cited

U.S. PATENT DOCUMENTS

| | | | | |
|---|---|---|---|---|
| 5,909,678 | A * | 6/1999 | Bergman et al. | |
| 7,398,201 | B2 * | 7/2008 | Marchisio et al. | 704/9 |
| 7,904,472 | B1 * | 3/2011 | Karnik | 707/779 |
| 7,953,720 | B1 | 5/2011 | Rohde et al. | |
| 8,650,026 | B2 * | 2/2014 | Ehsani et al. | 704/10 |
| 2003/0208490 | A1 * | 11/2003 | Larrea et al. | 707/9 |
| 2006/0181541 | A1 * | 8/2006 | Emura et al. | 345/581 |
| 2007/0033068 | A1 * | 2/2007 | Rao et al. | 705/2 |
| 2007/0271166 | A1 * | 11/2007 | Boone et al. | 705/36 R |
| 2008/0103756 | A1 * | 5/2008 | Singh et al. | 704/1 |
| 2009/0063500 | A1 * | 3/2009 | Zhai et al. | 707/10 |
| 2009/0138393 | A1 * | 5/2009 | Lemons et al. | 705/35 |
| 2010/0114944 | A1 * | 5/2010 | Adler et al. | 707/770 |
| 2012/0185479 | A1 * | 7/2012 | Korver | 707/737 |

\* cited by examiner

*Primary Examiner* — Jeffrey A Burke
*Assistant Examiner* — Thong Vu
(74) *Attorney, Agent, or Firm* — Fish & Richardson P.C.

(57) ABSTRACT

A server receives a query identifying one or more attributes of an entity. The server accesses a set of candidate templates for answering the query based on the one or more attributes of the entity, each candidate template having one or more fields, wherein each field is associated with at least one constraint. The server obtains a set of information that answers the query and selects a template from the set of candidate templates, where the selected template has a maximum number of fields with constraints that are satisfied by the set of information. The server then generates a phrase by adding the set of information to the one or more fields of the selected template, such that the phrase comprises an answer to the query. Finally, the server communicates the phrase to a client device.

20 Claims, 6 Drawing Sheets

GENERATING QUERY ANSWERS

TECHNICAL FIELD

This specification generally relates to generating answers to factual queries.

BACKGROUND

Search systems may generate responses to factual queries by providing facts from a database. For example, these facts may be stored in a graph that can be updated in real-time. However, such responses may be formatted as lists of search results rather than sentences.

SUMMARY

When a user asks a factual question, for example via voice to a dialog system, it may be desirable to have a natural response to the question. The most natural response may be an answer formulated as a grammatical statement of the facts that satisfy the question the user asked. Thus, according to one general aspect of the subject matter described in this specification, in response to a factual query, facts stored in a database are converted into a sentence in the language of the user.

One aspect of the subject matter described in this specification may be embodied in methods that include the actions of receiving a query identifying one or more attributes of an entity. The actions then include accessing a set of candidate templates for answering the query based on the one or more attributes of the entity, each candidate template having one or more fields, wherein each field is associated with at least one constraint. Then, the actions include obtaining a set of information that answers the query and selects a template from the set of candidate templates, where the selected template has a maximum number of fields with constraints that are satisfied by the set of information. In some implementations, the set of information may be a set of entity-attribute-value triples. The actions further include generating a phrase by adding the set of information to the one or more fields of the selected template, such that the phrase comprises an answer to the query. The phrase may be a sentence or a portion of a sentence. Finally, the actions include communicating the phrase to a client device. The phrase may be communicated as an audio signal corresponding to the phrase.

In some implementations, the constraints may include a type constraint, a temporal constraint, a gender constraint, a relationship constraint, a singular/plural constraint, a unit of measure constraint, and/or a determinant constraint.

Some implementations involve obtaining multiple sets of information that are responsive to a single attribute in the query. In such implementations, the actions further include obtaining a sentence template based on a type of the entity, wherein the sentence template includes a plurality of fields for phrases, and adding the phrases to the fields of the sentence template to form the sentence. Further, the actions include selecting, for each set of information, a template from the set of candidate templates and generating, for each selected template, a phrase by adding the respective set of information to the one or more fields of the respective selected template. Then, the actions include communicating the sentence including the phrases to a client device.

Some implementations involve a query that includes multiple attributes. In such implementations, the actions include receiving a query identifying multiple attributes of an entity. Then, the actions include accessing, for each attribute of the entity, a set of candidate templates for answering the query based on the respective attribute of the entity. The actions further include obtaining, for each attribute of the entity, a set of information that answers a respective portion of the query and selecting a template from the respective set of candidate templates. The actions then include generating, for each attribute of the entity, a phrase by adding the respective set of information to the one or more fields of the selected template. The actions also include obtaining a sentence template based on a type of the entity, wherein the sentence template includes a plurality of fields for phrases and adding the phrases to the fields of the sentence template to form a sentence. Finally, the actions include communicating a sentence including the phrases to a client device.

Other embodiments of these aspects include corresponding systems, apparatus, and computer programs, configured to perform the actions of the methods, encoded on computer storage devices.

Implementations described in this specification may realize one or more of the following advantages. In some implementations, the system is easily configurable and extendable to arbitrarily complex factual assertions and answers. In addition, it may allow for a clean separation of the factual database from the sentence generation mechanism. Moreover, it may allow the addition of new templates via any suitable method, for example manually or algorithmically.

The details of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a user asks a factual question, a search engine may provide an answer by accessing a database. Some systems, such as voice-based dialog systems, allow users to formulate queries as natural language questions (e.g., "Who is the president of Japan?"). In such cases, it may be desirable to provide a natural language answer in the form of a sentence rather than an answer formatted as search results referring to documents. Thus, systems described in this specification may convert facts from a database into sentences. This may be advantageous, for example, so that the answer can be rendered back to the user as speech.

To produce sentences that answer users' questions, it may be desirable to retrieve arbitrary facts from a database. For example, to answer a query such as who someone was married to, a system may obtain data including all past marriages, people involved in the past marriages, dates of the marriages, and types of marital agreements. A flexible database that represents facts using a graph structure may provide these facts as described below with reference to FIG. 1.

Once the facts have been collected, an answer engine may access one or more candidate templates for generating an answer based on the attribute or attributes provided in the query. For example, if the original query from a user is "Who was Woody Allen married to," the attribute may be "marriages." As another example, if the original query is "How old is Woody Allen," the attribute may be "age." As described below, each attribute of a query may correspond to multiple candidate templates, for example to support more or less detailed answers. For example, if the attribute is "age," the answer engine may obtain a template that includes birth date and age (e.g., {<entity> was born on <date> and is currently <value> years old}), a template that includes only age (e.g., {<entity> is currently <value> years old}), and a template that includes date of birth and date of death (e.g., {<entity> was born on <date> and died on <date>}). As described in more detail below, the portions of the templates enclosed in "< >" (i.e., the fields) may be associated with various constraints on the data they can hold. Once the answer engine has obtained the candidate templates, it selects the most relevant template based on various heuristics and generates a sentence by inserting the facts into the template. The answer engine can then provide an answer in the form of a sentence back to the user.

Figure 1:
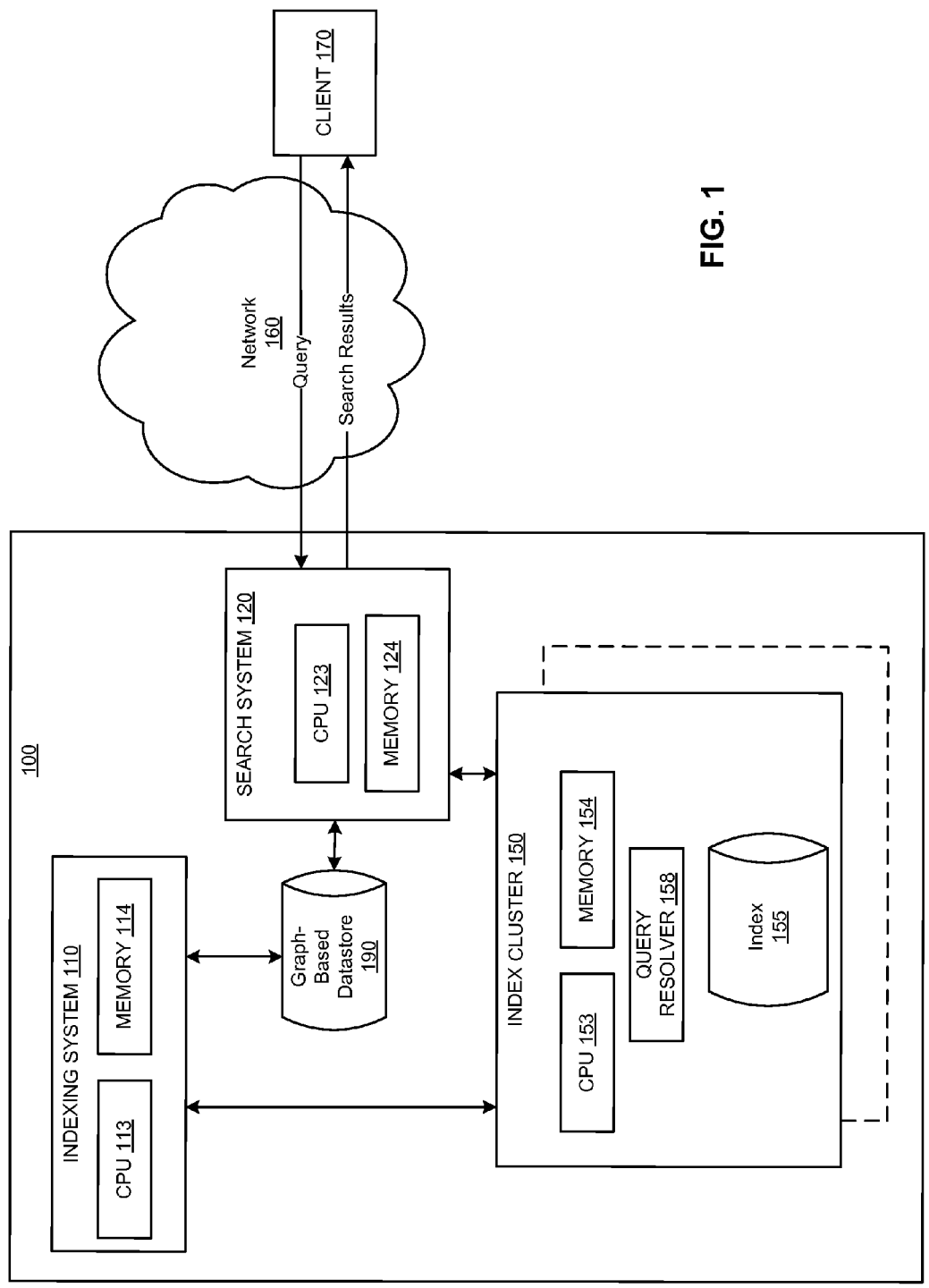
FIG. 1 is a diagram of an example system that generates responses to queries from a graph-based datastore.

FIG. 1 is a block diagram of a data graph search system 100 in accordance with an example implementation. The system 100 may be used to implement a search engine for a data graph using the techniques described herein. The depiction of system 100 in FIG. 1 is described as a search engine system for a data graph that processes query requests from a client. Other configurations and applications of the described technology may be used. For example, the query request may originate from another server, from a batch job, or from a user terminal in communication with data graph search system 100.

The data graph search system 100 may include indexing system 110, search system 120, and index cluster 150. Indexing system 110, search system 120, and index cluster 150 may be computing devices that take the form of a number of different devices, for example a standard server, a group of such servers, or a rack server system. In addition, indexing system 110, search system 120, and index cluster 150 may be implemented in a personal computer, for example a laptop computer.

The data graph search system 100 may include a graph-based datastore 190. Such a data graph stores nodes and edges, from which a graph, such as the graph illustrated in FIG. 5, can be created. The nodes may be referred to as entities and the edges may be referred to as relationships between two entities. Such relationships may be stored in a number of ways. In one example, the graph-based datastore 190 stores triples, also referred to as tuples, which represent the entities and relationships. A triple may include a <subject; predicate; object> format, with the subject representing a starting entity, the predicate representing an outward edge from the subject, and the object representing the entity pointed to by the outward edge. A triple may also include an <entity; attribute; value> format, with the entity representing the starting entity, the attribute representing a characteristic of a related entity as represented by an edge from the entity, and the value representing the related entity. For example, in FIG. 4, one example of a triple is the entity Woody Allen as the subject (or entity), the relationship acted in as the predicate (or attribute), and the entity Annie Hall as the object (or value). Of course, a data graph with a large number of entities and even a limited number of relationships may have billions of triples.

Indexing system 110 can include one or more processors 113 configured to execute one or more machine executable instructions or pieces of software, firmware, or a combination thereof. The indexing system 110 can include, an operating system (not shown) and one or more computer memories 114, for example a main memory, configured to store one or more pieces of data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules that, when executed by processor 113, perform certain operations. In other implementations, the modules may be stored in an external storage device (not shown) and loaded into memory 114. The modules, such as an indexer, may enable indexing system 110 to generate new index entries, update existing index entries, and generally maintain the index 155.

Like indexing system 110, search system 120 may include one or more processors 123, an operating system (not shown) and one or more computer memories 124. Search system 120 may include modules, stored in memory 124 or an external storage device (not shown) and loaded into memory 124 that enable the search system 120 to receive and respond to queries. Search system 120 may include one or more servers (not shown) that receive queries from a user of client 170 and provide those queries to the search system 120. The search system 120 may be responsible for searching the data graph and, in some implementations, other data sources, such as a corpus of documents from the Internet or an Intranet, in response to a query. For example, the search system 120 may receive a query from a client, such as client 170, perform some query processing, and send the query to index cluster 150 and to other indexing clusters that store indexes for searching other sources. In such an implementation, search system 120 may have a module that compiles the results from all sources and provides the compiled results to client 170. In some implementations, search system 120 may only send queries to index cluster 150 and may provide search results from index cluster 150 to client 170. Search system 120 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search system 120 may communicate with and transmit data to/from clients 170.

System 100 may also include an index cluster 150. Index cluster 150 may be a single computing device or a distributed database system with one or more computing devices, each with its own processor and memory. The number of computing devices that comprise index cluster 150 can vary and, for the sake of brevity, index cluster 150 is shown in FIG. 1 as a single entity. Each index cluster 150 can include one or more processors 153 configured to execute one or more machine executable instructions or pieces of software, firmware, or a combination thereof. The computing cluster 150 can include, an operating system (not shown) and one or more computer memories 154, for instance a main memory, configured to store one or more pieces of data, either temporarily, permanently, semi-permanently, or a combination thereof. Memory 154 may include any type of storage device that stores information in a format that can be read and/or executed by processor 153, including volatile memory, non-volatile memory, or a combination thereof. Index cluster 150 may also include one or more modules, such as query resolver 158, that access the index 155 to retrieve results responsive to the query. In some implementations, query resolver 158 may also be part of search system 120, or may be distributed between search system 120 and index cluster 150.

Figure 2:
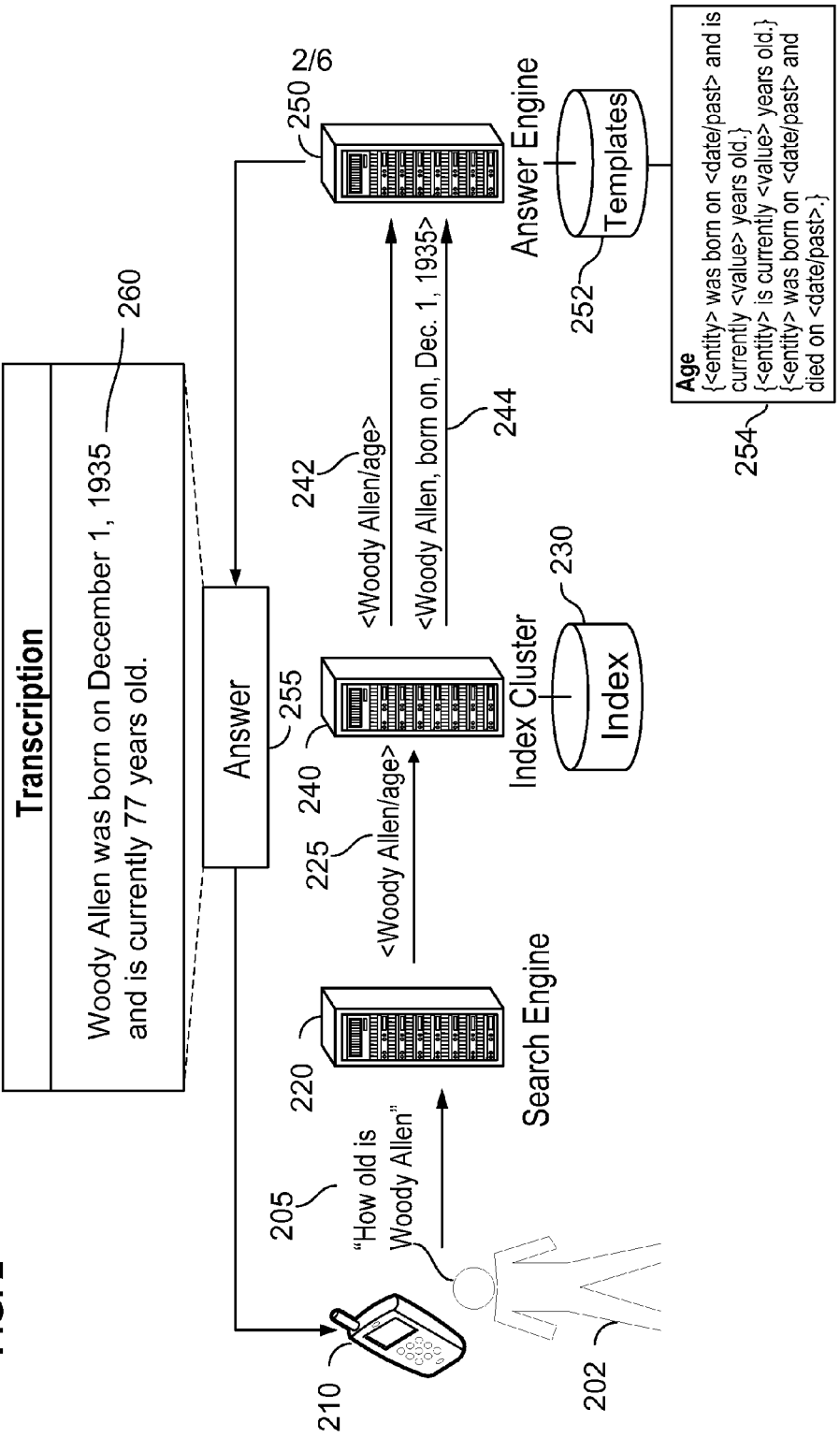
FIG. 2 is a diagram of an example system that generates sentences in response to factual queries.
Figure 3:
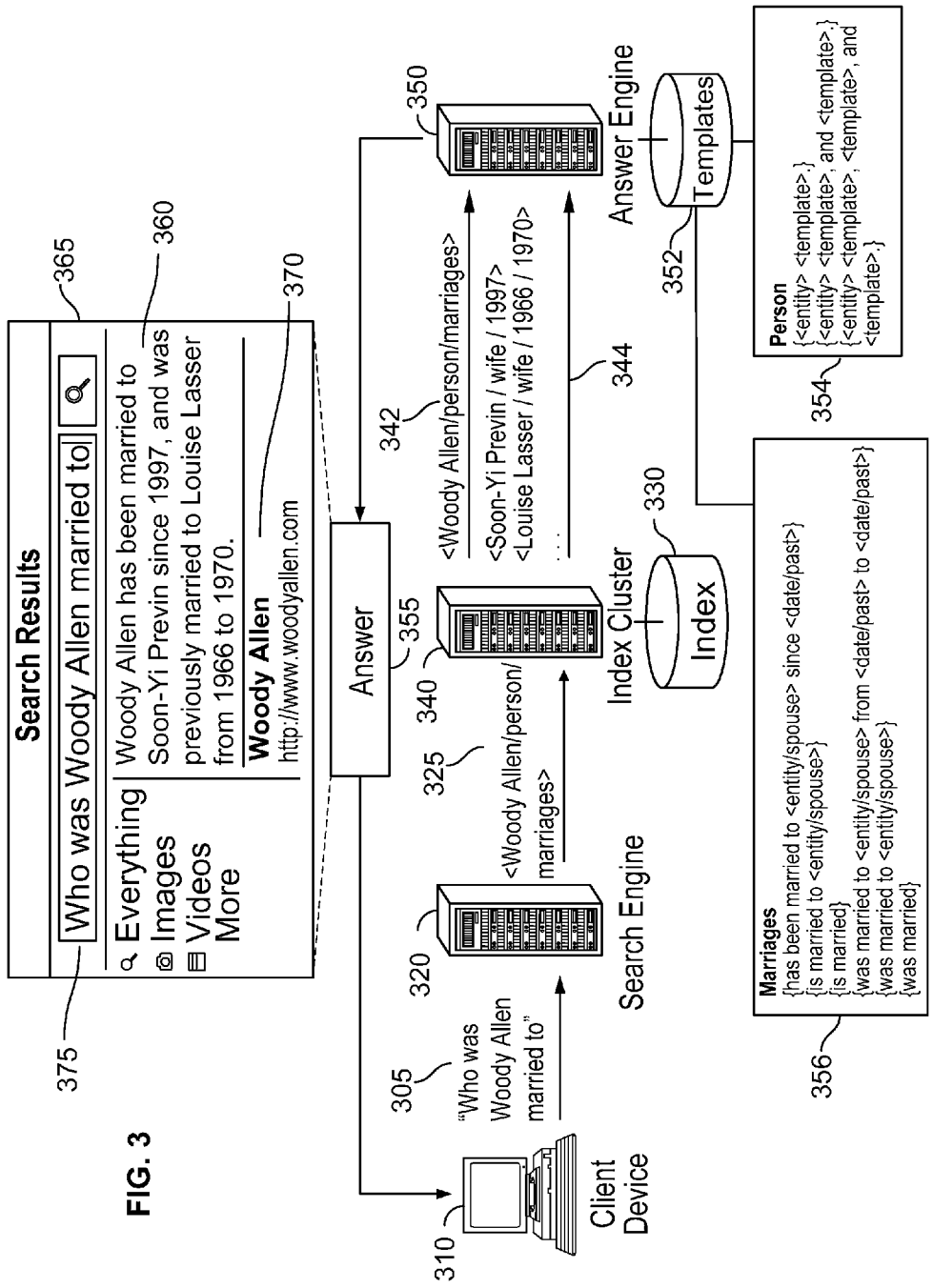
FIG. 3 is another diagram of an example system that generates sentences in response to factual queries.
Figure 4:
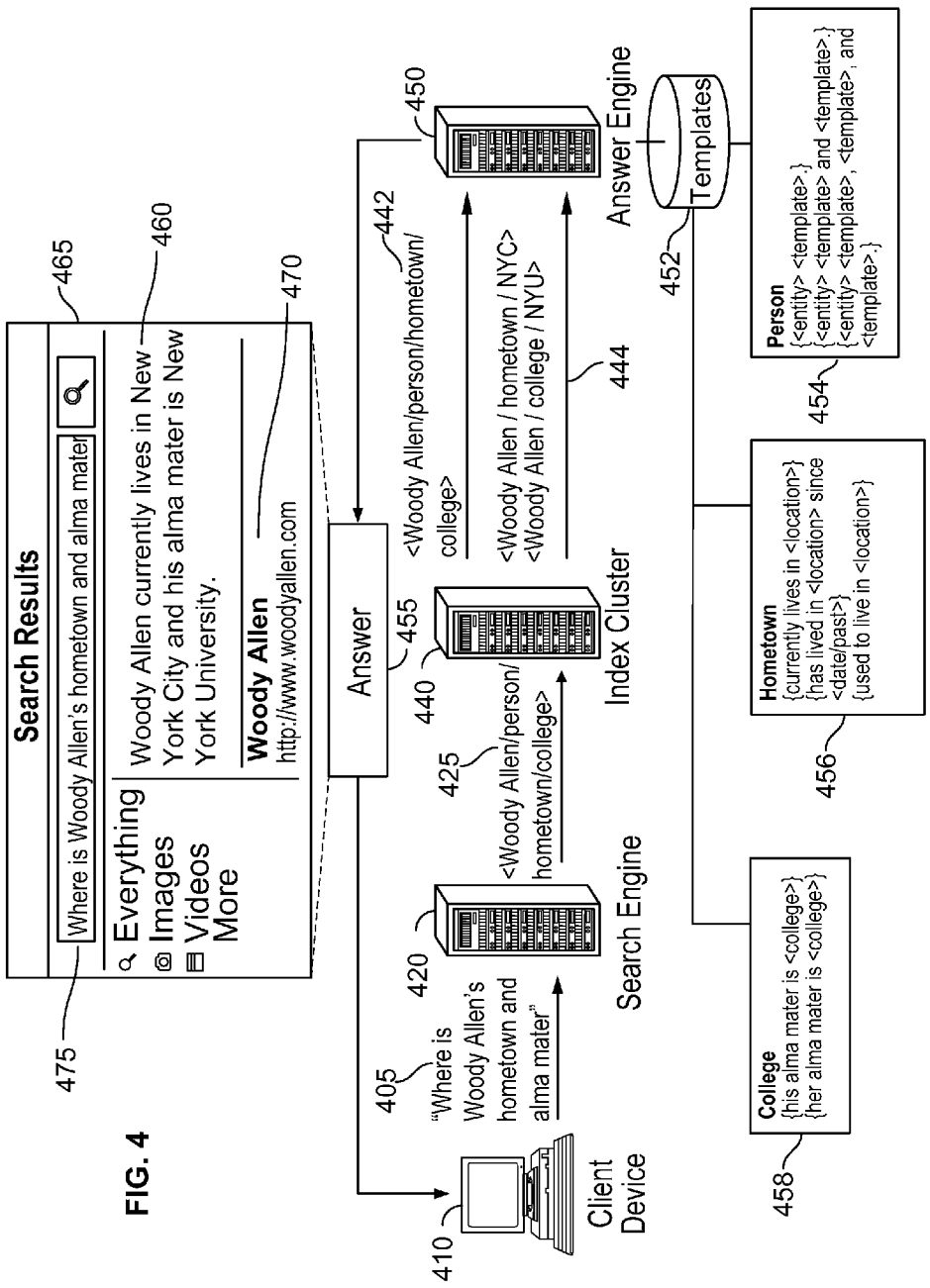
FIG. 4 is another diagram of an example system that generates sentences in response to factual queries.

FIGS. 2-4 described below illustrate implementations that involve progressively more complicated queries and answers. In particular, FIG. 2 shows an example of a simple query that involves one attribute ("age") and results in a single triple answer. FIG. 3 shows an example of a simple query that involves one attribute ("marriages") but results in a multiple triple answer. FIG. 4 shows an example of a complicated query that involves two attributes ("hometown and alma mater") and results in a multiple triple answer.

In more detail, FIG. 2 shows an example system 200 that generates sentences in response to factual queries. The system 200 includes a client device 210, a search system 220, an index cluster 240, and an answer engine 250. The entities illustrated in FIG. 2 can, for example, be implemented as part of the system illustrated in FIG. 1.

As shown in FIG. 2, a user 202 initiates a query having one or more query terms using a client device 210. As shown in FIG. 2, the user may format the original query 205 as a sentence. The client device 210 may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, an interactive or so-called "smart" television, or a combination of any two or more of these data processing devices or other data processing devices.

In some implementations, the user 202 may interact with the client device 210 using a voice-based dialog system. For example, the user 202 may utter the query "How old is Woody Allen" into a microphone of the client device 210. The client device 210 may then perform speech recognition to convert the utterance into a transcription, and then transmit the transcription to the search engine 220. Alternatively, the client device 210 may transmit audio speech data encoding the utterance.

The search system 220 receives the query 205 (e.g., "How old is Woody Allen") from the client device 210. If the query 205 is encoded as audio speech data, the search system 220 may convert the audio speech data into a transcription. The search system 220 then parses and formats the original query into an <entity; attribute> format (e.g., <Woody Allen/age>) using, for example, a suitable natural language parsing engine. The search system 220 then sends the formatted query 225 to the index cluster 240.

As described above, the index cluster 240 accesses the index 230 to retrieve results responsive to the query. These results may be a set of factual information in the form of one or more triples (e.g., <Woody Allen/born on/December 1, 1935>). The index cluster 240 then transmits the formatted query 242 (e.g., <Woody Allen/age>) and the factual information that answers the query 244 (e.g., <Woody Allen/born on/December 1, 1935>) to the answer engine 250.

Using the formatted query 242 and the factual information 244, the answer engine 250 then generates an answer 255 in the form of a sentence or sentences. The answer engine 250 generates an answer as follows. First, the answer engine 250 obtains the attribute or attributes from the formatted query 242. Then, the answer engine 250 uses the attribute or attributes to access candidate sentence or phrase templates from template database 252. Next, the answer engine 250 selects one of the templates based on the factual information 244 and various constraints associated with the candidate templates. Finally, the answer engine 250 fills in the fields in the selected template using the factual information 244.

In more detail, the answer engine 250 first obtains the attribute or attributes from the formatted query 242 by parsing the query. For example, assuming that the query 242 is formatted as an <entity/attribute> pair, the answer engine 250 extracts the attribute portion of the pair. In some cases, the formatted query 242 may include multiple attributes. For example, the formatted query 242 may be in the form of <entity/attribute/attribute>. In such cases, the answer engine 242 may extract each attribute from the query 242.

Next, the answer engine 250 accesses candidate templates for each attribute in the query 242 from template database 252. Each template may correspond to a full sentence or a portion of a sentence (e.g., a phrase). Each template includes one or more fields (shown as the portions in "< >" brackets) that can have factual information inserted. For example, a template may be "On <date>, <entity> was married to <value>." The templates can be manually or algorithmically generated.

In some implementations, the answer engine 250 identifies the language of the user 202, and selects candidate templates in the language of the user. For example, the answer engine 250 may receive data from the search engine 220 indicating the language of the original query 205. Advantageously, such a configuration may facilitate internationalization of the answer 255.

Fields may be associated with one or more constraints that govern the data that each field may contain. As used in this specification, the notation "<X/Y>" indicates a field having an "X" constraint and a "Y" constraint. Sample constraints may include type constraints, temporal constraints, gender constraints, relationship constraints, singular/plural constraints, units of measure constraints, and determinant constraints. A type constraint may require a specific type of data, e.g., a <date> constraint may require a date, an <entity> constraint may require an entity name or other identifier, and a <value> constraint may require a number. A temporal constraint may require, for example, that a date or time be in the past or in the future, e.g., a field containing <date/past> may require that the field includes a date that is in the past. A gender constraint may require, for example, a male or female gender. A relationship constraint may require, for example, a type of relationship to another entity, e.g., a field containing <entity/spouse> may require that the field include an entity that is the spouse of another entity. A singular/plural constraint may require, for example, the data in the field to be in the singular or plural form. A unit of measure constraint may, for example, require that the data in the field be measured in a specific unit of measure (e.g., inches, feet, centimeters, meters, etc.). A determinant constraint may require, for example, that the word "the" precede the field.

Each attribute in the query 242 may function as a key for accessing a set of candidate templates. For example the attribute "age" may result in the retrieval of the templates 254 shown in FIG. 2. The sample templates include a first template "<entity> was born on <date/past> and is currently <value> years old," which requires an entity name for the <entity> field, a date in the past for the <date/past> field, and a number (e.g., an age) for the <value> field. The second template, "<entity> is currently <value> years old," requires an entity name for the <entity> field and a number (e.g., an age) for the <value> field. The third template, "<entity> was born on <date/past> and died on <date/past>," requires an entity name for the <entity> field, and two past dates for the <date/past> fields. Advantageously, having multiple templates for a given attribute enables implementations to support partial facts. For example, for age templates, if the year of birth is known but the specific date is unknown, an appropriate template may be "<entity> was born in <year/past>." Providing multiple templates for a given attribute also allows changing tenses for different portions of facts (e.g., "Woody Allen is married" and "Woody Allen was married").

After obtaining the candidate templates, the answer engine 250 selects a template from the candidate templates based on various heuristics. For example, the answer engine 250 may check for gender agreement and correct tense. Additionally, the answer engine 250 may determine that the number of answers to the original query matches the number of fields of the selected template. The answer engine 250 may also determine whether the constraints and fields of the selected template are satisfied. In some implementations, the answer engine 250 may select the template having the maximum number of fields with constraints that are satisfied by the factual information 244 (e.g., the most data-rich template). For example, in FIG. 2, the factual information 244 is "<Woody Allen/born on/December 1, 1935>." In this example, the first candidate template is "<entity> was born on <date/past> and is currently <value> years old." This template has an <entity> field, a <date/past> field, and a <value> field. The factual information 244 provides an entity that satisfies the <entity> field constraint and a date in the past that satisfies the <date/past> field constraints. In some implementations, the answer engine 250 may derive values based on the factual information. The answer engine 250 may therefore calculate an age value to satisfy the <value> field constraint based on the birth date. Since the factual information 244 satisfies all of the constraints for the fields in the first template, the answer engine 250 selects the first template.

In some implementations, the answer engine 250 selects the first template with fields that can be filled by the factual information 244, and does not perform any additional processing. Alternatively, the answer engine 250 may process each template in the candidate templates and select the template having the largest quantity of fields that can be filled by the factual information 244.

After selecting the template, the answer engine 250 then generates a sentence or phrase based on the template. For example, the answer engine 250 may replace the fields in the template with the appropriate data from the factual information 244. In the example shown in FIG. 2, the answer engine 250 generates the sentence "Woody Allen was born on December 1, 1935 and is currently 77 years old" using the selected template. The answer engine 250 then transmits an answer 255 to the client device 210, where the answer 255 includes the generated sentence 260. As shown in FIG. 2, the answer 255 may be a transcription that the client device 210 converts to speech and renders for the user 202.

FIG. 3 shows another example system 300 that generates sentences in response to factual queries. The system 300 includes a client device 310, a search system 320, an index cluster 340, and an answer engine 350. The entities illustrated in FIG. 3 can, for example, be implemented as part of the system illustrated in FIG. 1.

As shown in FIG. 3, a client device 310 initiates a query 305 having one or more query terms. For example, a user may enter the query "Who was Woody Allen married to" into a web browser at the client device 310.

The search system 320 receives the query 305 (e.g., "Who was Woody Allen married to") from the client device 310. The search system 320 then parses and formats the original query into an <entity/type/attribute> format (e.g., <Woody Allen/person/marriages>) using, for example, a suitable natural language parsing engine. In this example, the formatted query 325 in FIG. 3 includes an identifier of the entity (e.g., Woody Allen), a type of the entity (e.g., person), and an attribute (e.g., marriages). The type information may be used to generate a meta-template as described below. The search system 320 then sends the formatted query 325 to the index cluster 340.

The index cluster 340 accesses the index 330 to retrieve a set of factual information that is responsive to the query. In FIG. 3, these results include at least two triples (e.g., <Soon-Yi Previn/wife/1997>, and <Louise Lasser/wife/1966/1970>). The index cluster 340 then transmits the formatted query 342 (e.g., <Woody Allen/age> and the factual information that answers the query 344 (e.g., <Soon-Yi Previn/wife/1997>, and <Louise Lasser/wife/1966/1970>) to the answer engine 350.

Using the formatted query 342 and the factual information 344, the answer engine 350 then generates an answer 355 in the form of a sentence or sentences as follows. First, the answer engine 350 obtains the type information from the formatted query 342 (e.g., person). The type information identifies the type of entity that the query 342 is based on. Using the type information, the answer engine 350 accesses candidate meta-templates that are associated with a "person" type of entity. As referred to in this specification, meta-templates are templates that have fields configured to contain other templates. For example, the candidate meta-templates 354 include three templates: "<entity> <template>." "<entity> <template> and <template>." and "<entity> <template>, <template>, and <template>." Each of the candidate meta-templates includes a field for a name or identifier of an entity and at least one field for adding other templates. These templates allow the answer engine 350 to generate sentences to incorporate various phrases having information about a person.

The answer engine 350 also obtains the attribute or attributes from the formatted query 342 and uses the attribute or attributes to access candidate phrase templates from template database 356. These phrase templates are designed to be incorporated in the meta-templates. As described above, each attribute in the query 342 may function as a key for accessing a set of candidate phrase templates. For example the attribute "marriages" may result in the retrieval of the phrase templates 356 shown in FIG. 3. The sample phrase templates include a first template "has been married to <entity/spouse> since <date/past>," which requires an entity who is married to the entity in the formatted query 342 for the <entity/spouse> field, and a date in the past for the <date/past> field. The second template, "is married to <entity/spouse>," requires an entity who is married to the entity in the formatted query 342 for the <entity/spouse> field. The third template, "is married," requires no additional information. The fourth template, "was married to <entity/spouse> from <date/past> to <date/past>," requires an entity who is married to the entity in the formatted query 342 for the <entity/spouse> field, and two dates in the past for the <date/past> fields. The fifth template, "was married to <entity/spouse>," requires an entity who is married to the entity in the formatted query 342 for the <entity/spouse> field. And the sixth template, "was married," requires no additional information.

Next, the answer engine 350 selects one of the candidate meta-templates 354 based on the type information included in the factual information 344. In particular, the answer engine 350 selects a candidate meta-template based on the number of triples included in the factual information 344. For example, in FIG. 3, two triples are included in the factual information 344. The answer engine 350 therefore selects the "person" meta-template having fields for two templates, i.e., "<entity> <template>, and <template>."

For each triple included in the factual information 344, the answer engine 350 also selects a template from the candidate phrase templates 356 as described above with reference to FIG. 2. In some implementations, the answer engine 350 may select the phrase template having the maximum number of fields with constraints that are satisfied by the factual information 344 (e.g., the most data-rich template).

For example, in FIG. 3, the first triple included in the factual information 344 is <Soon-Yi Previn/wife/1997>." In this example, the first candidate phrase template is "has been married to <entity/spouse> since <date/past>." This template has an <entity/spouse> field and a <date/past> field. The first triple has an entity with a spouse relationship to the entity in the formatted query 342 that satisfies the <entity/spouse> field constraint, and a date in the past that satisfies the <date/past> field constraints. Since the first triple satisfies all of the constraints for the fields in the first template, the answer engine 350 selects the first template for the first triple.

The second triple included in the factual information 344 is <Louise Lasser/wife/1966/1970>." The fourth candidate phrase template is "was married to <entity/spouse> from <date/past> to <date/past>," which has an <entity/spouse> field and two <date/past> fields. The second triple in the factual information 344 provides an entity with a spouse relationship to the entity in the formatted query 342 that satisfies the <entity/spouse> field constraint, and two dates in the past that satisfy the <date/past> field constraints. Since the second triple satisfies all of the constraints for the fields in the fourth template, the answer engine 350 selects the fourth template for the second triple.

In some implementations, the answer engine 350 selects the first template with fields that can be filled by the factual information 344, and does not perform any additional processing. Alternatively, the answer engine 350 may process each template in the candidate templates and select the template having the largest quantity of fields that can be filled by the factual information 344.

After selecting the templates, the answer engine 350 then generates a sentence based on the templates. For example, the answer engine 350 may replace the fields in the selected templates with the appropriate data from the factual information 344. The answer engine 350 may replace the fields in the first selected phrase template (i.e., "has been married to <entity/spouse> since <date/past>") with the information from the first triple to generate the phrase "has been married to Soon-Yi Previn since 1997." Likewise, the answer engine 350 may replace the fields in the second selected phrase template (i.e., "was married to <entity/spouse> from <date/past> to <date/past>") with the information from the second triple to generate the phrase "was married to Louise Lasser from 1966 to 1970." The answer engine 350 then replaces the template fields in the selected meta-template (i.e., "<entity> <template>, and <template>") with the phrases generated from the first and second phrase templates. Thus, the answer engine 350 generates the sentence 360 "Woody Allen has been married to Soon-Yi Previn since 1997, and was previously married to Louise Lasser from 1966 to 1970."

The answer engine 350 then transmits an answer 355 to the client device 310 that includes the generated sentence 360. As shown in FIG. 3, the answer 355 may be included in a search results page 365 that includes the sentence 360 and other search results 370. The search results page 365 also includes a search box 375 showing the original search query 305 (i.e., "Who was Woody Allen married to"). The search results page 365 may then be rendered by the client device 310. While shown in FIG. 3 as being provided in search results 365, the sentence 360 could alternatively be transmitted as a transcription that allows the client device 310 to generate speech, or as an audio signal encoding the sentence 360 for rendering at the client device.

FIG. 4 shows another example system 400 that generates sentences in response to factual queries. The system 400 includes a client device 410, a search system 420, an index cluster 440, and an answer engine 450. The entities illustrated in FIG. 4 can, for example, be implemented as part of the system illustrated in FIG. 1.

As shown in FIG. 4, a client device 410 initiates a query 405 having two query terms ("Where is Woody Allen's hometown and alma mater") into a web browser at the client device 410.

The search system 420 receives the query 405 (e.g., "Where is Woody Allen's hometown and alma mater") from the client device 410. The search system 420 then parses and formats the original query into an <entity/type/attribute> format (e.g., <Woody Allen/person/hometown/college>) using, for example, a suitable natural language parsing engine. In this example, the formatted query 425 includes an identifier of the entity (e.g., Woody Allen), a type of the entity (e.g., person), and two attributes (e.g., hometown and college). The search system 420 then sends the formatted query 425 to the index cluster 440.

The index cluster 440 retrieves sets of factual information that are responsive to the query. In FIG. 4, these results include two triples (e.g., <Woody Allen/hometown/NYC>, and <Woody Allen/college/NYU>). The index cluster 440 then transmits the formatted query 442 (e.g., <Woody Allen/person/hometown/college> and the factual information that answers the query 444 (e.g., <Woody Allen/hometown/NYC>, and <Woody Allen/college/NYU>) to the answer engine 450.

Using the formatted query 442 and the factual information 444, the answer engine 450 then generates an answer 455 in the form of a sentence or sentences as follows. First, the answer engine 450 obtains the type information from the formatted query 442 (e.g., person). Using the type information, the answer engine 450 accesses candidate meta-templates that are associated with a "person" type of entity. As referred to in this specification, meta-templates are templates that have fields configured to contain other templates. For example, the candidate meta-templates 454 include three templates: "<entity> <template>." "<entity> <template> and <template>." and "<entity><template>, <template>, and <template>." Each of the candidate meta-templates includes a field for a name or identifier of an entity and at least one field for adding other templates.

The answer engine 450 also obtains the attributes from the formatted query 442 and uses the attributes to access candidate phrase templates from template databases 456 and 458. These phrase templates are designed to be incorporated in the meta-templates. As described above, each attribute in the query 442 may function as a key for accessing a set of candidate phrase templates. For example, the attribute "hometown" may result in the retrieval of the phrase templates 456 shown in FIG. 4. The sample phrase templates include a first template "currently lives in <location>," which requires a geographic location for the <location> field. The second template, "has lived in <location> since <date/past>," requires a geographic location for the <location> field and a date in the past for the <date/past> field. The third template, "used to live in <location>," requires a geographic location for the location field. The attribute "college" may result in the retrieval of the phrase templates 458 shown in FIG. 4. The sample phrase templates include a first template "his alma mater is <college>," which requires a college name for the <college> field. The second template, "her alma mater is <college>," also requires a college name for the <college> field.

Next, the answer engine 450 selects one of the candidate meta-templates 454 based on the type information included in the factual information 444. In particular, the answer engine 450 selects a candidate meta-template based on the number of triples included in the factual information 444. For example, in FIG. 4, two triples are included in the factual information 444. The answer engine 450 therefore selects the "person" meta-template having fields for two templates, i.e., "<entity> <template> and <template>."

For each triple included in the factual information 444, the answer engine 450 also selects a template from the candidate phrase templates 456. In some implementations, the answer engine 450 may select the phrase template having the maximum number of fields with constraints that are satisfied by the factual information 344 (e.g., the most data-rich template). The answer engine 450 also may perform other heuristics, such as analyzing gender agreement and correct tense of the candidate templates.

For example, in FIG. 4, the first triple included in the factual information 444 is <Woody Allen/hometown/NYC>." In this example, the first candidate template in the hometown templates 456 is "currently lives in <location>." The first triple has location (i.e., NYC) that satisfies the <location> field constraint. Since the first triple satisfies all of the constraints for the fields in the first template, the answer engine 450 selects the first template from the hometown templates 456 for the first triple.

The second triple included in the factual information 444 is <Woody Allen/college/NYU>." The first candidate template in the college templates 458 is "his alma mater is <college>." The second triple in the factual information 444 provides a college name (i.e., NYU) that satisfies the <college> field constraint. Also, the answer engine 450 may determine that the gender of the entity (Woody Allen) agrees with the gender of the phrase in this template. Accordingly, the answer engine 450 selects the first template from the college templates 458 for the second triple.

In some implementations, the answer engine 450 selects the first template with fields that can be filled by the factual information 444, and does not perform any additional processing. Alternatively, the answer engine 450 may process each template in the candidate templates and select the template having the largest quantity of fields that can be filled by the factual information 444.

After selecting the templates, the answer engine 450 then generates a sentence based on the templates. For example, the answer engine 450 may replace the fields in the selected templates with the appropriate data from the factual information 444. The answer engine 450 may replace the fields in the first selected phrase template (i.e., "currently lives in <location>") with the information from the first triple to generate the phrase "currently lives in New York City." Likewise, the answer engine 450 may replace the fields in the second selected phrase template (i.e., "his alma mater is <college>") with the information from the second triple to generate the phrase "his alma mater is New York University." The answer engine 450 then replaces the template fields in the selected meta-template (i.e., "<entity> <template> and <template>") with the phrases generated from the first and second phrase templates. Thus, the answer engine 450 generates the sentence 460 "Woody Allen currently lives in New York City and his alma mater is New York University."

The answer engine 450 then transmits an answer 455 to the client device 410 that includes the generated sentence 460. As shown in FIG. 4, the answer 455 may be included in a search results page 465 that includes the sentence 460 and other search results 470. The search results page 465 also includes a search box 475 showing the original search query 405 (i.e., "Where is Woody Allen's hometown and alma mater"). The search results page 465 may then be rendered by the client device 410. While shown in FIG. 4 as being provided in search results 465, the sentence 460 could alternatively be transmitted as a transcription that allows the client device 410 to generate speech, or as an audio signal encoding the sentence 460 for rendering at the client device.

Figure 5:
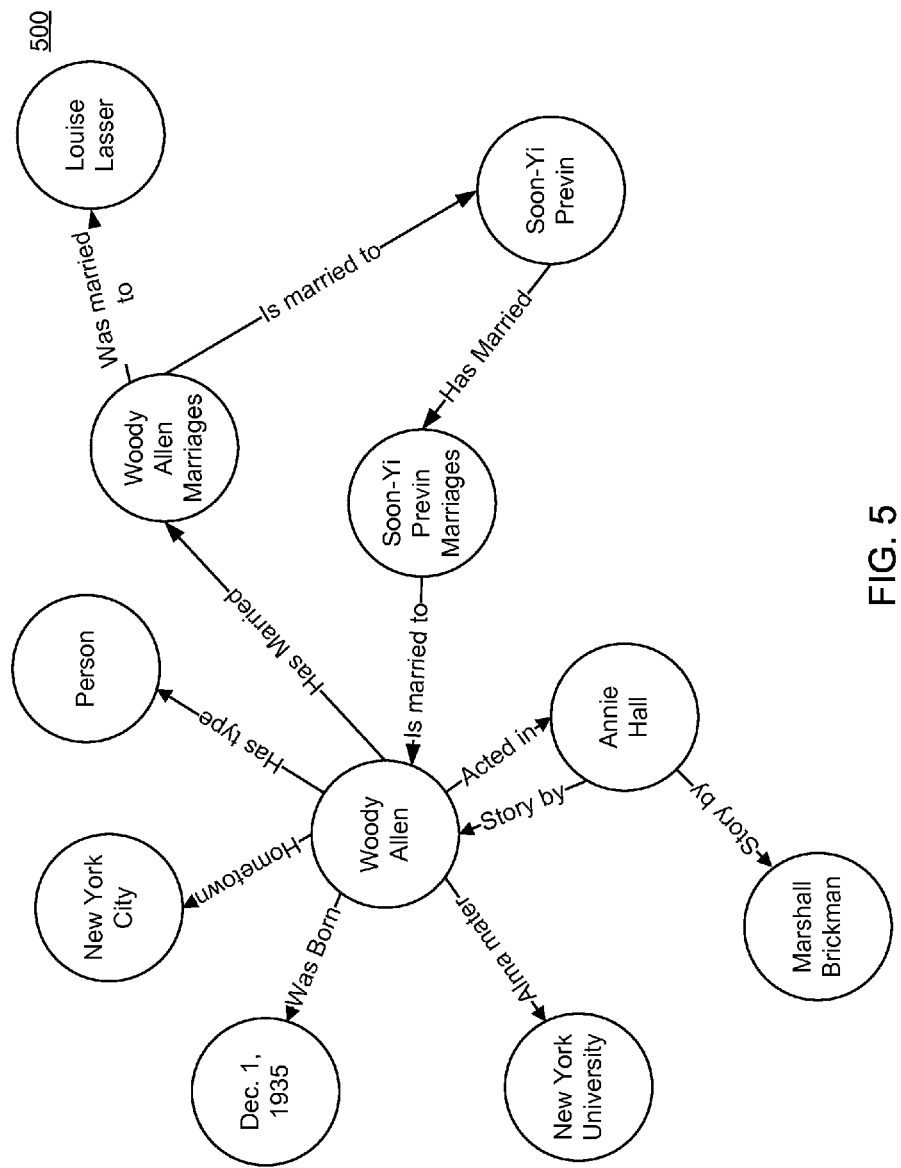
FIG. 5 is a diagram of an example data graph.

FIG. 5 shows an example data graph 500. The example data graph 500 includes nodes (e.g., entities) and edges connecting the nodes (e.g., relationships or attributes). Naturally, the example data graph 500 shows only a partial graph—a full graph with a large number of entities and even a limited number of relationships may have billions of triples.

An indexing system may traverse the data graph 500 to obtain factual information as various triples. One example of a triple that may be obtained is the entity "Woody Allen" as the subject (or entity), the relationship "was born" as the predicate (or attribute), and the entity "December 1, 1935" as the object (or value). Another example of a triple that may be obtained is the entity "Woody Allen" as the subject, the relationship "has type" as the predicate, and the entity "person" as the value. This triple may be used, for example, by the answer engine as described above to select candidate meta-templates. Another example of a triple that may be obtained is the entity "Woody Allen" as the subject, the relationship "was married to" as the predicate, and the entity "Louise Lasser" as the value. Note that to obtain this triple, the indexing system must traverse two edges in the data graph 500, i.e., from the "Woody Allen" entity to the "Woody Allen marriages" entity, and then from the "Woody Allen marriages" entity to the "Louise Lasser" entity.

Figure 6:
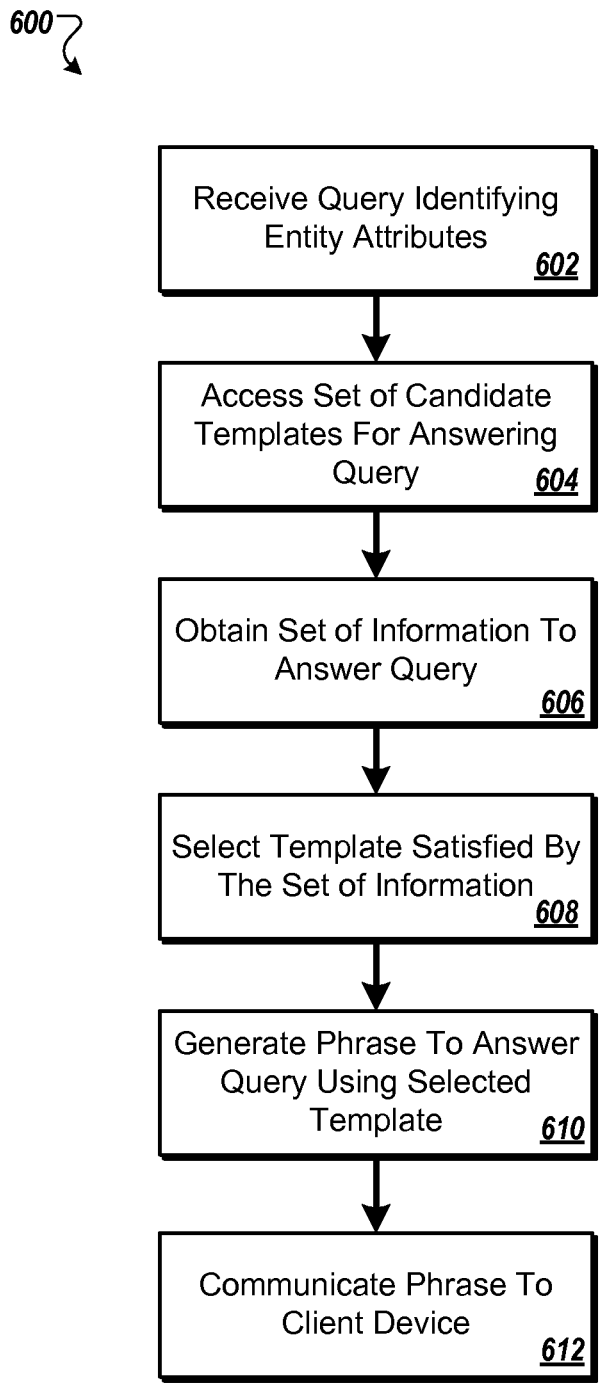
FIG. 6 is a flow chart of an example process for generating sentences in response to factual queries.

FIG. 6 shows an example process 600 for generating sentences in response to factual queries. In step 602, a server (e.g., an answer engine) receives an original query that identifies one or more attributes of an entity. For example, the server may receive a query that identifies multiple attributes of an entity (e.g., age, date of birth, place of birth, marriages, etc.).

Next, in step 604, the server accesses a set of candidate templates for answering the query based on the attributes of the entity. Each candidate template includes one or more fields, wherein each field is associated with at least one constraint. When multiple attributes are identified in the original query, the server accesses a set of candidate templates for each attribute of the entity. The constraints may include one or more of a type constraint, a temporal constraint, a gender constraint, a relationship constraint, a singular/plural constraint, a unit of measure constraint, and a determinant constraint.

The server then obtains a set of information that answers the query in step 606, for example by accessing a graph-based datastore as described above. The set of information that answers the query may be, for example, a set of entity-attribute-value triples. When multiple attributes are identified in the original query, the server obtains a set of information for each attribute (i.e., to answer each portion of the original query). In some implementations, multiple sets of information (e.g., multiple triples) may be responsive to a single attribute. For example, if the attribute is "marriages" or "children," then multiple triples may be obtained in response to the attribute.

Then, in step 608, the server selects a template from the set of candidate templates, where the selected template has a maximum number of fields with constraints that may be satisfied by the set of information that answers the query. When multiple attributes are identified in the original query, the server selects a template for each attribute from the appropriate set of candidate templates. Also, when multiple sets of information are obtained in response to a single attribute, the server may select multiple templates from the same set of candidate templates.

The server then generates a phrase in step 610. The phrase may be generated by adding the set of information that answers the query to the fields of the selected template so that the phrase answers the original query. In some implementations, the phrase may be one or more sentences. Alternatively or in addition, the phrase may be one or more portions of a sentence. When multiple attributes are identified in the original query, the server generates a phrase for each attribute. The server may then combine the phrases to generate a complete sentence.

In some implementations, the server may obtain a sentence template (e.g., a meta-template) based on the type of the entity (e.g., person or location). The sentence template may include multiple fields for inserting phrases. For example, the server may access a set of candidate meta-templates based on the type of entity, and then select a meta-template from the set based on the number of triples that answer the original query. The server may then add the generated phrases described with reference to step 610 to the fields of the sentence template to form a sentence.

Finally, in step 612, the server communicates the phrase or sentence to a client device. The client device may then output the phrase to a display or as speech audio. In some implementations, the server transmits an audio signal corresponding to the phrase or sentence to the client device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable medium storing instructions executable by one or more computers which, upon such execution, cause the one or more computers to perform operations comprising:

receiving, at a server, a query identifying one or more attributes of an entity;

accessing, at the server, a set of candidate templates for answering the query based on the one or more attributes of the entity, each candidate template having one or more fields, wherein each field is associated with at least one constraint;

obtaining, at the server, a set of information that answers the query;

selecting, at the server and from among the set of candidate templates, a template from which to generate a phrase that comprises an answer to the query, the selected template selected based on a determination that the selected template has a maximum number of fields with constraints that are satisfied by the set of information, in that no other template in the set of candidate templates has more fields with constraints that are satisfied by the set of information than the maximum number of fields of the selected template;

generating, at the server, the phrase by adding the set of information to the one or more fields of the selected template, such that the phrase comprises an answer to the query; and communicating, from the server, the phrase to a client device.

2. The computer-readable medium of claim 1, wherein the at least one constraint comprises one or more of a type constraint, a temporal constraint, a gender constraint, a relationship constraint, a singular/plural constraint, a unit of measure constraint, and a determinant constraint.

3. The computer-readable medium of claim 1, wherein the set of information that answers the query comprises a set of entity-attribute-value triples.

4. The computer-readable medium of claim 1, wherein the phrase comprises a sentence.

5. The computer-readable medium of claim 1,
wherein obtaining, at the server, a set of information that answers the query comprises obtaining at the server, a plurality of sets of information that answer the query;
wherein selecting, at the server, the template from which to generate the phrase that comprises an answer to the query comprises selecting at the server, for each of the plurality of sets of information, a template from the set of candidate templates;
wherein generating, at the server, the phrase by adding the set of information to the one or more fields of the selected template, such that the phrase comprises an answer to the query comprises generating at the server, for each of the selected templates, a phrase by adding the respective set of information to the one or more fields of the respective selected template; and
wherein communicating, from the server, the phrase for output by a client device comprises communicating from the server, a sentence including the phrases to a client device,
wherein the operations further comprise,
obtaining, at the server, a sentence template based on a type of the entity, wherein the sentence template includes a plurality of fields for phrases; and
adding the phrases to the fields of the sentence template to form the sentence.

6. The computer-readable medium of claim 1,
wherein receiving, at a server, a query identifying one or more attributes of an entity comprises receiving, at the server, a query identifying a plurality of attributes of an entity;
wherein accessing, at the server, a set of candidate templates for answering the query based on the one or more attributes of the entity comprises accessing at the server, for each of the plurality of attributes of the entity, a set of candidate templates for answering the query based on the respective attribute of the entity;
wherein obtaining, at the server, a set of information that answers the query comprises obtaining at the server, for each of the plurality of attributes of the entity, a set of information that answers a respective portion of the query;
wherein selecting, at the server, the template from which to generate the phrase that comprises an answer to the query comprises selecting at the server, for each of the plurality of attributes of the entity, a template from the respective set of candidate templates;
wherein generating, at the server, the phrase by adding the set of information to the one or more fields of the selected template, such that the phrase comprises an answer to the query comprises generating at the server, for each of the plurality of attributes of the entity, a phrase by adding the respective set of information to the one or more fields of the selected template; and
wherein communicating, from the server, the phrase for output by a client device comprises communicating from the server, a sentence including the phrases to a client device,
wherein the operations further comprise,
obtaining, at the server, a sentence template based on a type of the entity, wherein the sentence template includes a plurality of fields for phrases; and
adding the phrases to the fields of the sentence template to form the sentence.

7. The computer-readable medium of claim 1, wherein communicating, from the server, the phrase to a client device comprises communicating, from the server to the client device, an audio signal corresponding to the phrase.

8. A computer-implemented method comprising:
receiving, at a server, a query identifying one or more attributes of an entity;
accessing, at the server, a set of candidate templates for answering the query based on the one or more attributes of the entity, each candidate template having one or more fields, wherein each field is associated with at least one constraint;
obtaining, at the server, a set of information that answers the query;
selecting, at the server and from among the set of candidate templates, a template from which to generate a phrase that comprises an answer to the query, the selected template selected based on a determination that the selected template has a maximum number of fields with constraints that are satisfied by the set of information, in that no other template in the set of candidate templates has more fields with constraints that are satisfied by the set of information than the maximum number of fields of the selected template;
generating, at the server, the phrase by adding the set of information to the one or more fields of the selected template, such that the phrase comprises an answer to the query; and
communicating, from the server, the phrase to a client device.

9. The method of claim 8, wherein the at least one constraint comprises one or more of a type constraint, a temporal constraint, a gender constraint, a relationship constraint, a singular/plural constraint, a unit of measure constraint, and a determinant constraint.

10. The method of claim 8, wherein the set of information that answers the query comprises a set of entity-attribute-value triples.

11. The method of claim 8, wherein the phrase comprises a sentence.

12. The method of claim 8,
wherein obtaining, at the server, a set of information that answers the query comprises obtaining at the server, a plurality of sets of information that answer the query;
wherein selecting, at the server, the template from which to generate the phrase that comprises an answer to the query comprises selecting at the server, for each of the plurality of sets of information, a template from the set of candidate templates;
wherein generating, at the server, the phrase by adding the set of information to the one or more fields of the selected template, such that the phrase comprises an answer to the query comprises generating at the server, for each of the selected templates, a phrase by adding the respective set of information to the one or more fields of the respective selected template; and wherein communicating, from the server, the phrase for output by a client device comprises communicating from the server, a sentence including the phrases to a client device, further comprising, obtaining, at the server, a sentence template based on a type of the entity, wherein the sentence template includes a plurality of fields for phrases; and adding the phrases to the fields of the sentence template to form the sentence.

13. The method of claim 8, wherein receiving, at a server, a query identifying one or more attributes of an entity comprises receiving, at the server, a query identifying a plurality of attributes of an entity;

wherein accessing, at the server, a set of candidate templates for answering the query based on the one or more attributes of the entity comprises accessing at the server, for each of the plurality of attributes of the entity, a set of candidate templates for answering the query based on the respective attribute of the entity;

wherein obtaining, at the server, a set of information that answers the query comprises obtaining at the server, for each of the plurality of attributes of the entity, a set of information that answers a respective portion of the query;

wherein selecting, at the server, the template from which to generate the phrase that comprises an answer to the query comprises selecting at the server, for each of the plurality of attributes of the entity, a template from the respective set of candidate templates;

wherein generating, at the server, the phrase by adding the set of information to the one or more fields of the selected template, such that the phrase comprises an answer to the query comprises generating at the server, for each of the plurality of attributes of the entity, a phrase by adding the respective set of information to the one or more fields of the selected template; and wherein communicating, from the server, the phrase for output by a client device comprises communicating from the server, a sentence including the phrases to a client device, further comprising, obtaining, at the server, a sentence template based on a type of the entity, wherein the sentence template includes a plurality of fields for phrases; and adding the phrases to the fields of the sentence template to form the sentence.

14. The method of claim 8, wherein communicating, from the server, the phrase to a client device comprises communicating, from the server to the client device, an audio signal corresponding to the phrase.

15. A system comprising:

one or more computers and one or more storage devices storing instructions that are operable, when executed by the one or more computers, to cause the one or more computers to perform operations comprising:

receiving a query identifying one or more attributes of an entity;

accessing a set of candidate templates for answering the query based on the one or more attributes of the entity, each candidate template having one or more fields, wherein each field is associated with at least one constraint;

obtaining a set of information that answers the query;

selecting, from among the set of candidate templates, a template from which to generate a phrase that comprises an answer to the query, the selected template selected based on a determination that the selected template has a maximum number of fields with constraints that are satisfied by the set of information, in that no other template in the set of candidate templates has more fields with constraints that are satisfied by the set of information than the maximum number of fields of the selected template;

generating the phrase by adding the set of information to the one or more fields of the selected template, such that the phrase comprises an answer to the query; and communicating the phrase to a client device.

16. The system of claim 15, wherein the at least one constraint comprises one or more of a type constraint, a temporal constraint, a gender constraint, a relationship constraint, a singular/plural constraint, a unit of measure constraint, and a determinant constraint.

17. The system of claim 15, wherein the set of information that answers the query comprises a set of entity-attribute-value triples.

18. The system of claim 15, wherein the phrase comprises a sentence.

19. The system of claim 15, wherein obtaining a set of information that answers the query comprises obtaining at the server, a plurality of sets of information that answer the query;

wherein selecting the template from which to generate the phrase that comprises an answer to the query comprises selecting at the server, for each of the plurality of sets of information, a template from the set of candidate templates;

wherein generating the phrase by adding the set of information to the one or more fields of the selected template, such that the phrase comprises an answer to the query comprises generating at the server, for each of the selected templates, a phrase by adding the respective set of information to the one or more fields of the respective selected template; and wherein communicating the phrase for output by a client device comprises communicating from the server, a sentence including the phrases to a client device, wherein the operations further comprise, obtaining a sentence template based on a type of the entity, wherein the sentence template includes a plurality of fields for phrases; and adding the phrases to the fields of the sentence template to form the sentence.

20. The system of claim 15, wherein receiving a query identifying one or more attributes of an entity comprises receiving, at the server, a query identifying a plurality of attributes of an entity;

wherein accessing a set of candidate templates for answering the query based on the one or more attributes of the entity comprises accessing at the server, for each of the plurality of attributes of the entity, a set of candidate templates for answering the query based on the respective attribute of the entity;

wherein obtaining a set of information that answers the query comprises obtaining at the server, for each of the plurality of attributes of the entity, a set of information that answers a respective portion of the query;

wherein selecting the template from which to generate the phrase that comprises an answer to the query comprises selecting at the server, for each of the plurality of attributes of the entity, a template from the respective set of candidate templates;

wherein generating the phrase by adding the set of information to the one or more fields of the selected template, such that the phrase comprises an answer to the query comprises generating at the server, for each of the plurality of attributes of the entity, a phrase by adding the respective set of information to the one or more fields of the selected template; and wherein communicating the phrase for output by a client device comprises communicating from the server, a sentence including the phrases to a client device, wherein the operations further comprise, obtaining a sentence template based on a type of the entity, wherein the sentence template includes a plurality of fields for phrases; and adding the phrases to the fields of the sentence template to form the sentence.

\* \* \* \* \*

UNITED STATES PATENT AND TRADEMARK OFFICE
CERTIFICATE OF CORRECTION

PATENT NO. : 10,031,953 B1
APPLICATION NO. : 13/803986
DATED : July 24, 2018
INVENTOR(S) : Sahin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this
Fourteenth Day of May, 2019

Andrei Iancu
*Director of the United States Patent and Trademark Office*